United States Patent Office 2,983,745
Patented May 9, 1961

2,983,745
SILPROPOXANES

John L. Speier, Pittsburgh, Pa., assignor to Dow Corning Corporation, Midland, Mich., a corporation of Michigan No Drawing. Filed July 18, 1956, Ser. No. 598,528

3 Claims. (Cl. 260—448.2)

The present invention relates to organosilicon compounds containing units of the formula (—SiRR'CH$_2$CH$_2$CH$_2$O—)

where R represents a methyl, ethyl or phenyl radical and R' represents a methyl or ethyl radical.

Linear and cyclic organopolysiloxanes in which each silicon atom is linked to every other silicon atom through oxygen atoms, thus taking the form SiOSiO, are well known in the field of organosilicon chemistry. Silcarbanes, wherein the silicon atoms are linked to one another through divalent hydrocarbon radicals (e.g. of the type SiCH$_2$Si and SiC$_6$H$_5$Si) are also well known in this field. Mixed polymers containing both of the above types of linkages, e.g. SiOSiCH$_2$SiO and the like, have also been prepared. In all of these polymers every linkage between silicon atoms is either through an oxygen atom or a hydrocarbon radical.

It is an object of the present invention to prepare novel organosilicon compounds wherein at least a portion of the silicon atoms are linked by means of what may be called propoxy bridges, i.e. compounds which take the general formula —SiCH$_2$CH$_2$CH$_2$O—, which I refer to herein as silpropoxanes. It is a further object of this invention to prepare novel organosilicon compounds which are readily polymerizable and which are extremely reactive toward organic acids to provide organosilicon compounds in which acyloxy groups are attached to silicon through a divalent propylene radical.

The materials of this invention can take the form of either homopolymers or copolymers. The homopolymers are represented by both cyclic and linear compounds, both of which may be represented by the general formula (HO)$_y$(—SiRR'CH$_2$CH$_2$CH$_2$O—)$_x$H$_z$ where R and R' are as above defined, $x$ is any positive integer and $y$ and $z$ are equal to one another and may be 0 or 1. When $y$ and $z$ are 1 in the above formula, the compound is a hydroxy endblocked polymer with repeating units of the defined character. Such linear polymers vary from low viscosity fluids where $x$ is 1 or a low integer up to extremely high viscosity fluids or even gels wherein $x$ represents, e.g., a number in the region of 100 to 200.

When $y$ and $z$ in the above formula are 0 the formula represents a cyclic compound which again varies from low viscosity fluids where $x$ is 1 or a low integer up to extremely viscous materials when $x$ is a large number. When $x$ has a value of 1, the compound is a silaoxacyclopentane which has the follow structure:

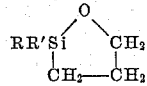

The larger cyclics merely contain a repeating polymeric unit in a larger cyclic chain. Thus, for example, the cyclic in which $x$ represents 2 has the structure:

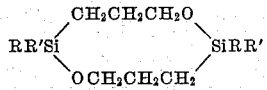

The most preferred of the various compounds which fall within the scope of the above formulas are those in which both R and R' represent methyl radicals.

The products of this invention can be prepared from a compound of the formula [RR'(HOCH$_2$CH$_2$CH$_2$)Si]$_2$O, which when heated yields 2 mols of the silaoxacyclopentane as described above and 1 mol of water for each mol of the disiloxane. This reaction is a reversible one, however, and upon cooling, the latter two products can revert at least partially back to the disiloxane if they are allowed to remain in contact with one another. Thus the water must be removed from the system if the silaoxacyclopentane is to be recovered as such. This water can be removed by azeotropic distillation, by sending the distillate from the defined siloxane through a moisture acceptor such as freshly fired alumina, by distillation from dehydrating agents, or other suitable means.

The silaoxacyclopentane described above polymerizes upon standing at room temperature to polymers of the type (—SiRR'CH$_2$CH$_2$CH$_2$O—)$_x$. If a slight trace of water is present during this self-polymerization, the cyclic chain does not close but takes the form of the hydroxy endblocked polymer, i.e. HO(—SiRR'CH$_2$CH$_2$CH$_2$O—)$_x$H.

The disiloxane [RR'(HOCH$_2$CH$_2$CH$_2$)Si]$_2$O can best be obtained in the following manner. A hydrogenosilane of the formula RR'SiHCl is reacted with allyl acetate in the presence of chloroplatinic acid or Pt deposited on finely divided carbon to produce the corresponding acetoxypropyl substituted diorganochlorosilane, which is then hydrolyzed to yield the disiloxane, e.g.

[RR'(AcOCH$_2$CH$_2$CH$_2$)Si]$_2$O where Ac represents the acetyl radical. This reaction is preferably carried out at a temperature in the region of 80° to 180° C. and where the acid catalyst is used it is preferably employed in an amount of from 1×10$^{-6}$ to 1×10$^{-4}$ mol per mol of the silane. This reaction is of the type which is described in detail in my copending application, Serial No. 550,831, filed December 5, 1955 (now Patent No. 2,823,218, issued February 11, 1958). Where Pt deposited on carbon is the catalyst, the catalytic mass preferably contains at least 1 percent by weight of Pt.

The acetoxypropyl substituted disiloxane described above can then be converted to the corresponding hydroxypropyl derivative by typical alcoholysis procedures, such as by treating the material with an alcohol and an acid catalyst such as HCl or toluene sulfonic acid, or by treating it with an alcohol and an alkaline catalyst such as KOH or NaOH and neutralizing the reaction product.

Although the above described method of producing the products of this invention is completely effective, it does lead to some difficulty in that in the final step water must be carefully and immediately removed from the cyclopentane product. I have found that the cyclopentane in question can be prepared by an alternative method which avoids these difficulties. In this alternative method a diallyloxy substituted silane of the formula RR'Si(OCH$_2$CH=CH$_2$)$_2$ is reacted with a disiloxane of the formula (RR'HSi)$_2$O in the presence of chloroplatinic acid as a catalyst, using the same preferred temperature ranges and catalyst concentrations described above, and then heating the resulting reaction product in the presence of any of the well known siloxane depolymerization catalysts and removing the evolved depolymerization product by distillation. The depolymerization, or "cracking" catalyst which is employed in this method can be, for example, an alkali metal hydroxide such as KOH, NaOH, or LiOH, or a strong mineral acid (among which HCl is particularly preferred) or any of the other materials which have been widely discussed in the literature as organosiloxane cracking or depolymerization catalysts, e.g. CaOH and various metallic halides such as MgCl₂ and FeCl₃. Cracking the product of the chloroplatinic acid catalyzed reaction in this manner yields both the silaoxacyclopentane which has been described above and conventional diorganosiloxane cyclic polymers as well. This preparation can be represented as follows:

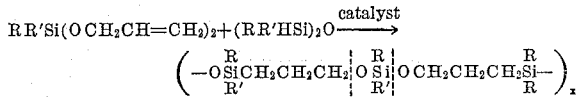

When the product shown in the above equation is subjected to catalytic cracking, cleavage takes place as indicated by the dotted lines in the product formula, producing the silaoxacyclopentane of this invention with cyclics of the formula $(RR'SiO)_x$ as by-products.

The optimum cracking temperature will of course vary with the nature of the catalyst employed and the type of R and R' radicals present. Ordinarily a temperature in the range of 170° to 280° C. is employed, and the products are removed from the system by distillation as they are evolved. The concentration of the depolymerization catalyst can vary over a wide range, for excess amounts do no particular harm and amounts lower than the optimum merely lengthen the reaction time. Best results are obtained by using from 0.1 to 5 percent by weight of the catalyst based on the weight of the siloxane being cracked.

The polymeric units of this invention can also be incorporated into otherwise conventional organosiloxane polymers containing units of the formula

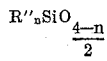

wherein $R''$ is a monovalent hydrocarbon radical or a halogenated monovalent hydrocarbon radical and $n$ has a value of from 1 to 3 inclusive. Examples of suitable $R''$ radicals are alkyl radicals such as methyl, ethyl, propyl and octadecyl; aralkyl radicals such as benzyl; aromatic radicals such as phenyl, tolyl, xenyl and xylyl; cycloaliphatic radicals such as cyclohexyl; alkenyl radicals such as vinyl, allyl and hexenyl; and halogenated hydrocarbon radicals such as mono- or dichlorophenyl, mono- or dibromophenyl, tetrafluoroethyl, α,α,α-trifluorotolyl, tetrabromoxenyl, chlorocyclohexyl and chlorovinyl radicals. Preferably from 1 to 99 molar percent of the units in the copolymer are the silpropoxane units.

The copolymers of this invention can be prepared by merely mixing the silaoxacyclopentane or any of the other "silpropoxane" polymers which have been discussed above with a conventional organosiloxane polymer containing the defined

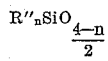

units and heating the mixture with an of the well-known organosiloxane polymerization catalysts. The latter catalysts are in general the same as the depolymerization catalysts which have been described previously, but as is well known in the field of organosilicon chemistry they are employed in a lesser concentration and the organosilicon compound is generally heated at a lower temperature than that required for depolymerization. Thus, for example, the silpropoxanes can be mixed with a conventional organosiloxane polymer such as $[(CH_3)_2SiO]_4$, KOH or NaOH added in an amount of about 1 K or Na atom for every 500 to 5,000 Si atoms and the mixture heated at about 160° C. to produce a copolymer in which all of the units originally present in the mixture are substantially evenly distributed throughout the copolymeric structure. The organosiloxane polymers and copolymers containing only the above-defined R''ₙSiO₍₄₋ₙ₎/₂ units are well known in the art and many are commercially available materials. Fractional average values for $n$ are obtained in this system when more than one type of the units $R''SiO_{1.5}$, $R''_2SiO$, and $R''_3SiO_{.5}$ which fall within this definition are present. The $R''$ radicals in any particular copolymer can be the same or different radicals.

The following examples are illustrative only. The symbols Me, Et, Ph and Ac are used to represent the radicals methyl, ethyl, phenyl and acetyl respectively. All parts are parts by weight.

Example 1

A mixture of 1,000 parts of allyl acetate and 4 parts of a catalyst consisting of platinum deposited on finely divided charcoal and which contained 1% platinum by weight was heated to reflux at about 103° C. The catalyst had been prepared by dissolving chloroplatinic acid in water, neutralizing the solution with KOH, adding finely divided charcoal to the solution, and bubbling hydrogen through the slurry to precipitate the platinum, followed by filtering, washing, and drying the resultant product. To the refluxing allyl acetate and catalyst there was added 1060 parts (20% excess) of Me₂SiHCl at an addition rate such that reflux temperature was maintained by the resulting exothermic reaction. The catalyst was then removed by filtration and the filtrate was distilled to give an 86% yield of the product

boiling at 109° C. at 24.5 mm. Hg pressure, $n_D^{25}$ 1.4342, $d_4^{25}$ 1.018.

The acetoxypropyldimethylchlorosilane was poured slowly into crushed ice with rapid stirring and the reaction mixture allowed to come to room temperature. The hydrolyzate was separated from the excess water, washed three times with water, the remaining trace of HCl neutralized with potassium carbonate, and then the product given two additional washings. The hydrolyzate was then separated from the wash water and dried over anhydrous sodium sulfate. The resulting product was filtered and the filtrate was distilled to give the acetoxypropyl substituted disiloxane of the formula

boiling at 179° C. at 15 mm. Hg pressure, $n_D^{25}$ 1.4322, $d_4^{25}$ 0.9732.

The acetoxypropyl substituted disiloxane as above prepared was then saponified by dissolving it in benzene, adding an ethanol-KOH solution containing a 10 percent excess of the theoretical amount of KOH necessary for complete saponification, and heating the solution at reflux temperature for 1.5 hours. The reaction product was then acidified with HCl, the insoluble inorganic salt removed by filtration, and the filtrate washed to remove residual salts and excess HCl. The alcohol and a portion of the benzene were then stripped off, the residue dried, and the remainder of the benzene removed at reduced pressure. The undistilled liquid product was the slightly impure disiloxane dialcohol,

$n_D^{25}$ 1.4472, $d_4^{25}$ 0.9531, $R_D$ 0.2804.

The distillate from the dialcohol so obtained contained the dialcohol itself, water, and the compound 2,2-dimethyl 2-sila-1-oxa-cyclopentane, i.e.

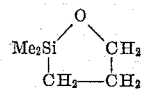

It was found that when the latter "silaoxapentane" stood at room temperature in contact with water, it slowly changed back to the original dialcohol as well as to increasingly viscous polymers of the formula

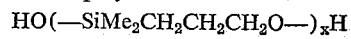

where $x$ was greater than 1.

Example 2

A further portion of the acetoxypropyl substituted disiloxane of Example 1 was converted to the corresponding dialcohol by a methanolysis reaction in which the acetoxy compound was dissolved in an eight-fold excess of methanol, a catalytic quantity of KOH added (in a ratio of 1 K per 1000 Si atoms) and the mixture allowed to stand at room temperature for seven days. The mixture was neutralized and the formed methyl acetate was then removed by distilling off the MeOH—MeOAc azeotrope and the excess MeOH. The residual liquid was the desired dialcohol, $$[Me_2(HOCH_2CH_2CH_2)Si]_2O$$

A portion of the dialcohol thus prepared was distilled through a column packed with freshly fired alumina pellets to act as a moisture acceptor. The still pot temperature was 160° C. during this distillation, and the distillate was the cyclic pentamer described in Example 1, boiling at 103° C. at 740 mm. Hg, $n_D^{25}$ 1.4415, $d_4^{25}$ 0.9178, $R_D$ 0.2880. A further portion of the dialcohol was mixed with CaO in an amount twice that theoretically necessary to react with the expected amount of by-produced $H_2O$. Direct distillation from the mixture gave almost a quantitative yield of the desired cyclic pentamer, i.e. 2,2-dimethyl 2-sila-1-oxa-cyclopentane.

Example 3

The silaoxacyclopentane of Example 2 was allowed to stand at room temperature. Within six hours the refractive index increased from the earlier value of 1.4415 to 1.4503, and in seven days reached a value of 1.4535, where it remained constant. The viscosity of the material increased throughout this time, due to the formation of higher cyclic polymers of the unit formula $$(-SiMe_2CH_2CH_2CH_2O-)_x$$

where $x$ is an integer greater than 1.

Example 4

When the cyclic pentamer of Example 2 is mixed with an equimolar amount of $(Me_2SiO)_4$ and powdered KOH in an amount of 1 K atom per 1000 Si atoms, and the mixture heated at 160° C. for several hours, a rubbery copolymer is obtained which contains units of the formula $Me_2SiO$ and $(-SiMe_2CH_2CH_2CH_2O-)$. Similar copolymerization with a copolymer containing $Me_4SiO_{.5}$, $Cl_2C_6H_3MeSiO$, $MeEtSiO$, and $Me_2SiO$ units in a molar ratio of 20:10:10:60 produces a fluid copolymer containing all of these units and the dimethylsilpropoxane units, the latter being present in an amount of 50 molar percent per 10, 5, 5, and 30 molar percent respectively of the aforesaid units.

Example 5

A mixture containing 81.7 parts $$Me_2Si(OCH_2CH=CH_2)_2$$

(0.475 mol, prepared from the reaction of allyl alcohol with $Me_2SiCl_2$) and about $1.6 \times 10^{-6}$ mol of chloroplatinic acid was heated to 100° C. 67 parts (0.5 mol, 5% excess) $(Me_2SiH)_2O$ was added slowly over a period of 1 hour at a rate sufficient to maintain a temperature of 110–115° C. without the application of external heat. The resulting product had a viscosity of 15.5 cs. at 25° C. When this product was strip distilled to remove the excess $(Me_2SiH)_2O$, the residue was a copolymer of the formula $$[-OSiCH_2CH_2CH_2OSiOCH_2CH_2CH_2Si-]_x$$
$$\phantom{[-O}\underset{Me_2}{|}\phantom{CH_2CH_2CH_2O}\underset{Me_2}{|}\phantom{OCH_2CH_2CH_2}\underset{Me_2}{|}$$

with a viscosity of 67 cs. at 25° C. Heating this copolymer at a temperature of 200° C. at a pressure of 25 mm. Hg failed to yield any volatile products. A portion of the copolymer was mixed with 0.7% by weight powdered KOH and the mixture subjected to strip distillation. At a pot temperature of 170° C. the evolution of volatile material began. This evolution continued until a temperature of 265° C. was reached and practically all of the original copolymer was gone. The distillate was fractionated and was found to be a mixture of the cyclic trimer and tetramer of dimethylpolysiloxane and the compound 2,2-dimethyl 2-sila-1-oxa-cyclo-pentane. A further portion of the copolymer was mixed with 3% by weight calcium hydroxide and the resulting mixture was subjected to thermal cracking as above. It was found that the same depolymerization products were obtained as when KOH had been used as the catalyst but that the rate of depolymerization and evolution of the desired product was much slower. A further portion of the original copolymer was also subjected to catalytic cracking, using 1% by weight of magnesium chloride as the catalyst. The same products as previously obtained were again produced, although at a slower rate than when KOH had been employed as the catalyst and with slight carbonization of the distillation residue.

Example 6

When PhEtSiHCl and allyl acetate are reacted in the presence of platinum deposited on charcoal as in Example 1, the product $PhEt(AcOCH_2CH_2CH_2)SiCl$ is obtained. The hydrolysis and alcoholysis of this silane by the procedure of Example 1 produces the disiloxane $$[PhEt(HOCH_2CH_2CH_2)Si]_2O$$

The distillation of the latter from a calcium oxide slurry provides the cyclic silpropoxane, $$-SiPhEtCH_2CH_2CH_2O-$$

and cyclic polymers thereof. In the presence of a trace of moisture the cyclic polymerizes to linear polymers of the formula $HO(-SiPhEtCH_2CH_2CH_2O-)_xH$ where $x$ ranges from 2 up to undeterminable high numbers.

The silpropoxanes of this invention are useful as lubricants, as intermediates in the preparation of fluid and resinous organosiloxane copolymers which themselves have the utility of the well-known conventional organosiloxanes, and as intermediates in reactions with organic acids to prepare various corresponding acyloxypropyl substituted organosilicon compounds.

That which is claimed is:

1. The method which comprises reacting at a temperature of at least 80° C. a silane of the formula $$RR'Si(OCH_2CH=CH_2)_2$$

with a disiloxane of the formula $(RR'HSi)_2O$ in the presence of chloroplatinic acid as a catalyst, where R is selected from the group consisting of methyl, ethyl, and phenyl radicals and R' is selected from the group consisting of methyl and ethyl radicals, heating the reaction product in the presence of a siloxane depolymerization catalyst, and distilling off the evolved depolymerization product.

2. A copolymeric organosilicon compound in which from 1 to 99 molar percent of the polymeric units are of the formula $(-SiRR'CH_2CH_2CH_2O-)$, where R is selected from the group consisting of methyl, ethyl, and phenyl radicals and R' is selected from the group consisting of methyl and ethyl radicals, and the remaining units are of the formula $$R''_nSiO_{\frac{4-n}{2}}$$

where R" is selected from the group consisting of monovalent hydrocarbon radicals and halogenated monovalent hydrocarbon radicals, and $n$ is an integer of from 1 to 3 inclusive.

3. A copolymeric organosilicon compound in accordance with claim 2 wherein each R, R', and R" is a methyl radical.

No references cited.

UNITED STATES PATENT OFFICE
CERTIFICATE OF CORRECTION

Patent No. 2,983,745           May 9, 1961

John L. Speier

It is hereby certified that error appears in the above numbered patent requiring correction and that the said Letters Patent should read as corrected below.

Column 3, lines 10 to 12, the formula should read as shown below instead of as in the patent:

column 5, line 47, for the formula "$Me_4SiO_{.5}$" read -- $Me_3SiO_{.5}$ --.

Signed and sealed this 2nd day of January 1962.

(SEAL)
Attest:

ERNEST W. SWIDER           DAVID L. LADD
Attesting Officer           Commissioner of Patents